US008036360B1

(12) United States Patent
Gogineni et al.

(10) Patent No.: US 8,036,360 B1
(45) Date of Patent: Oct. 11, 2011

(54) SYSTEM AND METHOD FOR HOOK STATE NOTIFICATION

(75) Inventors: Surya B. Gogineni, Morrisville, NC (US); Daniel P. Linton, Apex, NC (US); Umesh P. Katapadi, Raleigh, NC (US); Wayne Leung, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1320 days.

(21) Appl. No.: 11/380,671

(22) Filed: Apr. 28, 2006

(51) Int. Cl.
H04M 3/42 (2006.01)

(52) U.S. Cl. .......... 379/207.05; 379/207.04; 379/207.07

(58) Field of Classification Search ............. 379/207.05, 379/207.04, 207.07, 207.06, 201.01; 370/352
See application file for complete search history.

(56) References Cited

U.S. PATENT DOCUMENTS

| | | | |
|---|---|---|---|
| 3,963,874 A | 6/1976 | Pommerening et al. .. | 179/18 AB |
| 4,809,321 A | 2/1989 | Morganstein et al. ........ | 379/211 |
| 6,501,750 B1 | 12/2002 | Shaffer et al. ................ | 370/352 |
| 6,510,162 B1 | 1/2003 | Fijolek et al. ................ | 370/432 |
| 6,546,087 B2 | 4/2003 | Shaffer et al. ............ | 379/90.01 |
| 6,567,505 B1 | 5/2003 | Omori et al. ..................... | 379/84 |
| 6,601,099 B1 | 7/2003 | Corneliussen ................ | 709/224 |
| 6,614,899 B1 | 9/2003 | Sollee et al. ............. | 379/218.01 |
| 6,615,236 B2 | 9/2003 | Donovan et al. .............. | 709/203 |
| 6,625,141 B1 | 9/2003 | Glitho et al. .................. | 370/352 |
| 6,636,594 B1 | 10/2003 | Oran .......................... | 379/201.01 |
| 6,658,095 B1 | 12/2003 | Yoakum et al. ............ | 379/93.01 |
| 6,661,799 B1 | 12/2003 | Molitor .......................... | 370/401 |
| 6,665,723 B2 | 12/2003 | Trossen ......................... | 709/227 |
| 6,678,735 B1 | 1/2004 | Orton et al. .................... | 709/230 |
| 6,684,147 B2 | 1/2004 | Park et al. ......................... | 701/71 |
| 6,731,625 B1 | 5/2004 | Eastep et al. .................. | 370/352 |
| 6,738,390 B1 | 5/2004 | Xu et al. ........................ | 370/467 |
| 6,754,181 B1 | 6/2004 | Elliott et al. .................. | 370/252 |
| 6,760,322 B1 | 7/2004 | Fukuda et al. ................ | 370/352 |
| 6,785,246 B2 | 8/2004 | Foti ................................ | 370/261 |
| 6,788,676 B2 | 9/2004 | Partanen et al. .............. | 370/352 |
| 2004/0218583 A1* | 11/2004 | Adan et al. ..................... | 370/352 |
| 2006/0007954 A1 | 1/2006 | Agrawal et al. ............... | 370/466 |
| 2006/0146790 A1* | 7/2006 | Caballero-McCann et al. ............................. | 370/352 |
| 2008/0317008 A1* | 12/2008 | Forte-McRobbie et al. .. | 370/352 |

OTHER PUBLICATIONS

R. Mahy et al., "Remote Call in SIP using the REFER method and the session-oriented dialog package," Internet Draft (no longer posted on Internet), *The Internet Society*, Feb. 2004, 35 pages, Feb. 2004.
R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, *The Internet Society*, Mar. 5, 2006, 14 pages, Mar. 5, 2006.

(Continued)

*Primary Examiner* — Thjuan K Addy
(74) *Attorney, Agent, or Firm* — Baker Botts L.L.P.

(57) ABSTRACT

In one embodiment of the invention, a method produces a hook status notification. The method comprises detecting an off-hook state, allocating a half-dialog identification, generating an off-hook notification message, and associating the half-dialog identification with the off-hook notification message. In an alternative embodiment, a communication platform is adapted to comprise a processor component operable to receive an off-hook notification message comprising a half-dialog identification, and to store the half-dialog identification. The communication platform subsequently receives a signaling protocol message initiating a dialog, wherein the signaling protocol message is associated with the half-dialog identification. The communication platform then correlates the second signaling protocol message with the stored half-dialog identification.

13 Claims, 2 Drawing Sheets

OTHER PUBLICATIONS

H. Schulzrinne et al., "RTP Payload for DTMF Digits, Telephony Tones and Telephony Signals," *The Internet Society*, http://tools.ietf.org/html/rfc2833, May 2000, 29 pages, May 2000.

A. B. Roach, "Session Initiation Protocol (SIP)-Specific Event Notification," *The Internet Society*, http://www.ietf.org/rfc/rfc3265.txt, Jun. 2002, 36 pages, Jun. 2002.

J. Rosenberg et al., "An Offer/Answer Model with the Session Description Protocol (SDP)," *The Internet Society*, http://www.ietf.org/rfc/rfc3264.txt, Jun. 2002, 24 pages, Jun. 2002.

J. Rosenberg et al., "Caller Preferences for the Session Initiation Protocol (SIP)," *The Internet Society*, http://www.ietf.org/rfc/rfc3841.txt, Aug. 2004, 25 pages, Aug. 2004.

H. Schulzrinne, "Session Initiation Protocol (SIP)-H.323 Interworking Requirements," *The Internet Society*, http://www.ietf.org/rfc/rfc4123.txt, Jul. 2005, 15 pages, Jul. 2005.

J. Rosenberg et al., "SIP: Session Initiation Protocol," Standards Track, *The Internet Society*, Jun. 2002, 252 pages, Jun. 2002.

R. Mahy, et al., "The Session Initiation Protocol (SIP) 'Join' Header," The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ieffreport.isoc.org/idref/draft-ietf-sipping-dialog-package-06.txt, 38 pages, Apr. 12, 2005.

* cited by examiner

SYSTEM AND METHOD FOR HOOK STATE NOTIFICATION

TECHNICAL FIELD OF THE INVENTION

This invention relates in general to communications, and, more particularly, to a system and a method for hook state notification in a communication system.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies that exist in the current marketplace.

As new communication architectures (such as the Session Initiation Protocol) become available to the consumer, new processes need to be developed in order to optimize this emerging technology. For example, current open standard telephony environments are unable to provide many advanced calling features to the consumer. In order to deliver a sustainable product that can compete with conventional architectures, telephony developers need a platform for enabling advanced calling features.

SUMMARY OF THE INVENTION

In accordance with some of the embodiments of the present invention, the disadvantages and problems associated with providing advanced calling features in a telephony environment have been substantially reduced or eliminated. In particular, problems associated with implementing features that are dependent on hook states in such an environment have been substantially reduced or eliminated.

In accordance with one embodiment of the present invention, a method produces a hook status notification. The method comprises detecting an off-hook state, allocating a half-dialog identification, generating an off-hook notification message, and associating the half-dialog identification with the off-hook notification message.

In accordance with another embodiment of the present invention, a communication platform is provided that comprises a processor component operable to receive an off-hook notification message including a half-dialog identification, and to store the half-dialog identification. The communication platform subsequently receives a signaling protocol message initiating a dialog, wherein the signaling protocol message is associated with the half-dialog identification. The communication platform then correlates the second signaling protocol message with the stored half-dialog identification.

Important technical advantages of certain embodiments of the present invention include leveraging existing infrastructure to communicate hook states, and correlating off-hook events with subsequent requests.

Other important technical advantages of certain embodiments of the present invention include enabling or improving the operation of advanced calling features, such as call-back and hook status displays associated with speed-dial entries and other contact lists.

Still other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
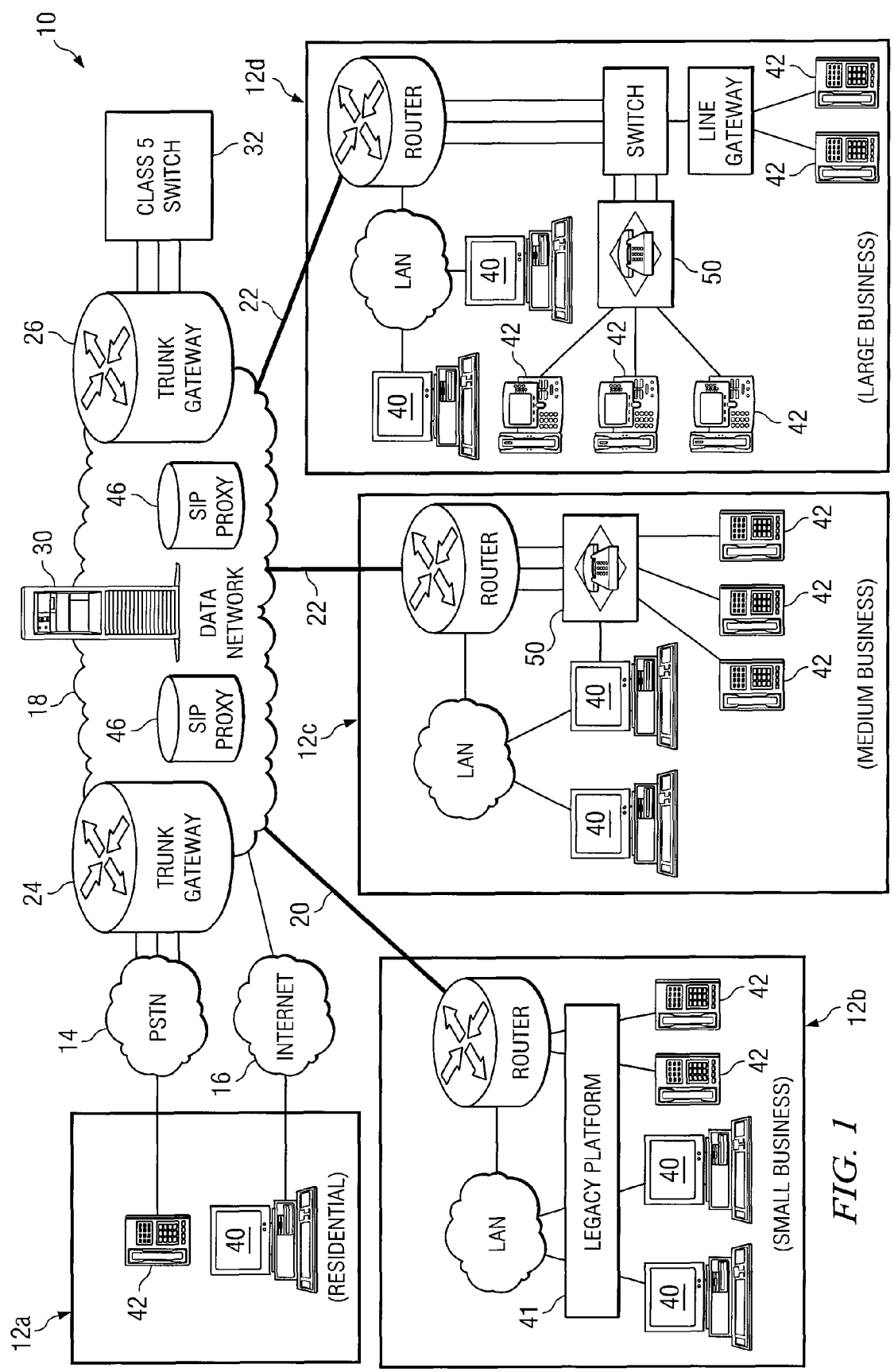
FIG. 1 is a simplified block diagram of an exemplary communication system for exchanging data in accordance with certain teachings of the present invention.

FIG. 1 is a simplified block diagram of an exemplary communication system 10 for exchanging data in accordance with certain teachings of the present invention. Communication system 10 includes domains 12a-12d, a public switched telephone network (PSTN) 14, a wide-area network 16 (such as the Internet), a data network 18, a broadband access link 20, and a number of additional links 22. Additional links 22 may include, for example, a digital subscriber line (DSL) link, a T1 link, a fiber optic link, or a wireless link. Communication system 10 also includes a set of trunk gateways 24 and 26, a third-party application server 30, a Class-5 switch 32, and may include one or more proxies 46.

Each domain may include suitable network equipment and appropriate infrastructure (e.g., switches, routers, LANs, gateways, etc.) to facilitate a communication session. Domain 12a represents a residential location, which consists of a computer 40 and a telephone 42. Telephone 42 may be an Internet protocol (IP) telephone or a standard telephone operable to interface with computer 40 such that one or more IP telephony capabilities are enabled through telephone 42. Accordingly, two types of telephones are illustrated in FIG. 1. Domain 12b represents a small business entity, which consists of a local area network (LAN), a router, several computers 40, and several telephones 42. In addition, domain 12b may include a legacy platform 41, which is operable to communicate with each telephone 42 and/or computer 40.

Domain 12c represents a medium business entity, which consists of a LAN, router, a private branch exchange (PBX) or key system, several computers 40, and several telephones 42. Domain 12d is a large business entity, which consists of a LAN, a router, a switch, a line gateway, several computers 40, and several telephones 42. Note that domains 12c and 12d each include a communication platform 50, which is operable to communicate with any number of "endpoints" (e.g., telephones 42 and/or computer 40). Communication platform 50 may be any suitable unit operable to interface with endpoints (e.g., telephone 42, computer 40, etc.).

Note that the term "endpoint" encompasses a myriad of potential devices and infrastructure that may benefit from the operations of communication system 10. Endpoints may represent a personal digital assistant (PDA), a cellular telephone, a standard telephone (which may be coupled to a personal computer), an IP telephone, a personal computer, a laptop computer, a mobile telephone, or any other suitable device or element (or any appropriate combination of these elements) that is operable to receive data or information. FIG. 1 illustrates only one set of example devices that may be used within communication system 10. The present invention is replete with numerous alternatives that could be used to facilitate the operations of communication system 10.

It should also be noted that the internal structure of elements within domains 12a-d are malleable and may be readily changed, modified, rearranged, or reconfigured in order to achieve intended operations. As noted above, software and/or hardware may reside in any element of domains 12a-d in order to implement the notification and correlation features of the present invention. Specifically, such items may be included in (or loaded into) any targeted communication platform (e.g., legacy platform 41 or communication platform 50) and/or endpoint (e.g. telephones 42 and/or computers 40). However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the elements included within domains 12a-d in the context of communication system 10 and, accordingly, it should be construed as such.

In certain embodiments of the present invention, communication platform 50 is a back-to-back user agent (B2BUA) that may implement various IP telephony signaling protocols and functions. A B2BUA is an intermediary element that establishes sessions and facilitates dialogs between endpoints. A B2BUA receives requests from endpoints and determines how the requests should be answered. A B2BUA generally maintains dialog state and participates in all requests sent in dialogs that it has established. In a particular embodiment of the present invention, communication platform 50 is a B2BUA that is manufactured and marketed as "Call Manager" by Cisco Systems, Inc. of San Jose, Calif.

Also in certain embodiments of the present invention, communication platform 50 and various endpoints implement the Session Initiation Protocol (SIP), which is an open standard protocol. Thus, for purposes of teaching and discussion, it also is useful to provide some overview of an exemplary SIP environment in which certain features of the present invention may be implemented. The following foundational information may be viewed as a basis from which the present invention may be properly explained. Such information is offered earnestly for purposes of explanation only, and accordingly, should not be construed in any way to limit the broad scope of the present invention and its potential applications.

SIP is an application-layer control protocol that can establish, modify, and terminate multimedia sessions (conferences) over a switched-packet network. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

In general, SIP supports five facets of establishing and terminating multimedia communications: 1) user location (determining the end system to be used for communication); 2) user availability (determining the willingness of the called party to engage in communications); 3) user capabilities (determining the media and media parameters to be used); 4) session setup ("ringing" establishment of session parameters at both called and calling party locations); and 5) session management (including transfer and termination of sessions, modifying session parameters, and invoking services).

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. SIP can function with SOAP, HTTP, XML, SDP, and a variety of other protocols to implement services.

Endpoints in a SIP environment communicate by exchanging messages, which may be either a "request" or a "response." Generally, an endpoint (also sometimes referred to as a "user agent" or "UA") operates as either a User Agent Client (UAC) or a User Agent Server (UAS), although a single endpoint can (and often does) operate as both a UAC and a UAS. A UAC generates requests and sends them to one or more UASs. A UAS receives requests, processes them, and sends responses.

Proxy elements also play a significant role in many SIP environments. A SIP proxy (or SIP proxy server) is any intermediary element that may act as a UAC or a UAS, or both, for the purpose of exchanging messages on behalf of other user agents. Generally, the primary function of a SIP proxy server, such as SIP proxy 46 in FIG. 1, is to route messages between SIP endpoints.

When a UAC desires to initiate communication session, the UAC transmits an INVITE request. The INVITE request may be forwarded by one or more proxies or B2BUAs, eventually arriving at one or more UASs that may accept the INVITE. Before accepting or rejecting an INVITE, though, a UAS may send one or more provisional responses to advise the UAC of the INVITE progress.

A "dialog" is another significant concept in a SIP environment. A dialog generally represents a peer-to-peer SIP relationship between two UAs that persists for some time. The dialog facilitates sequencing of messages between the UAs, as well as proper request routing between them. Two endpoints may create a dialog through a variety of methods, but an INVITE is generally regarded as the most common method. An early state of a dialog in which one endpoint has sent an INVITE but has not received a response is sometime referred to as a "half-dialog." In a SIP environment, a dialog is identified by three attributes: a call-id, a local-tag, and a remote-tag. According to the current SIP standard, the call-id and local-tag are allocated by a UAC when generating a request outside of any existing dialog. A UAS that responds to the request allocates the remote-tag. Thus, a half-dialog may be identified by the first two attributes only, since the remote-tag is not set until a remote UAS responds to a request.

SIP also provides a framework for endpoints to request asynchronous notification of events within a SIP environment. In particular, the SIP notification framework provides a SUBSCRIBE method and a NOTIFY method. A first SIP endpoint (i.e. the "subscriber") sends a SIP request with a SUBSCRIBE method to a second SIP endpoint (i.e. the "notifier") to request state information about some resource. If the subscription is accepted, the notifier is responsible for sending SIP messages with the NOTIFY method to provide the requested state information to the subscriber. Notifications may be triggered by a certain event, a timer, or some other mechanism. For example, a first endpoint may send a SUBSCRIBE message to a second endpoint, requesting notification of changes in the second endpoint's dialog state. If the second endpoint accepts the subscription from the first endpoint, the second endpoint will then send a NOTIFY message when its state changes.

The general notification framework described above may be extended by more specific "event packages," which define a set of state information to be reported by a notifier to a subscriber. One such event package is an INVITE-initiated dialog event package, referred to herein as the "dialog event package."

The current dialog event package specification defines a limited finite state machine (FSM). The dialog FSM includes dialog states between transmission of an INVITE and the creation of actual dialogs through receipt of appropriate responses. A notifier may generate a NOTIFY message upon any event transition of the FSM. The NOTIFY message includes a NOTIFY body that describes the state of a subscribed resource. In the dialog event package, the NOTIFY body contains a "dialog information document," which describes the state of one or more dialogs associated with a subscribed resource. According to current standards, the dialog information document is an extensible markup language (XML) document, but it may comprise other document formats capable of representing dialog state.

Current standards also specify that a dialog information document includes a dialog element, which reports information about a specific dialog or half-dialog. It has a single mandatory attribute: "id". The id attribute provides a single string that can be used as an identifier for the dialog or half-dialog. The dialog element may also comprise several optional attributes, which parallel the SIP attributes that identify a dialog: call-id, local-tag, and remote tag.

According to certain teachings of the present invention, an endpoint is adapted to process subscriptions and notifications for hook state transitions. Hook states include "off-hook" and "on-hook." The terms "off-hook" and "on-hook" reflect notions of a conventional telephone device that generally had a separate earpiece, which was removed and replaced on a switch-hook. In the context of the present invention, though, the term off-hook refers to any active state of an endpoint, while the term on-hook refers to any inactive state of an endpoint.

Moreover, an endpoint adapted in accordance with the teachings of the present invention also pre-allocates a call-id and a local-tag when an endpoint goes off-hook. The endpoint subsequently includes the pre-allocated call-id and local-tag in a dialog element of a notification message sent to a subscriber of hook state transitions, and in any subsequent requests that the endpoint generates before the hook state changes again (e.g., goes on-hook).

According to certain teachings of the present invention, a communication platform also is adapted to subscribe to and process hook state transition notification messages having the pre-allocated call-id and local-tag. The communication platform is further adapted to store the call-id and local-tag so that it can correlate subsequent requests with the hook state transition.

In an alternative or additional embodiment, the schema of the dialog information document is extended to provide additional information and support for advanced calling features. More particularly the dialog element is extended to include additional elements that identify a global call identifier (GCI) and the dialog identification of a primary call when the hook state transition is for a consultative call (e.g. a transfer or conference call). Accordingly, a communication platform also may be adapted to process these additional elements in a dialog information document. To implement certain enhanced features, an endpoint may also be adapted to generate these additional elements.

Figure 2:
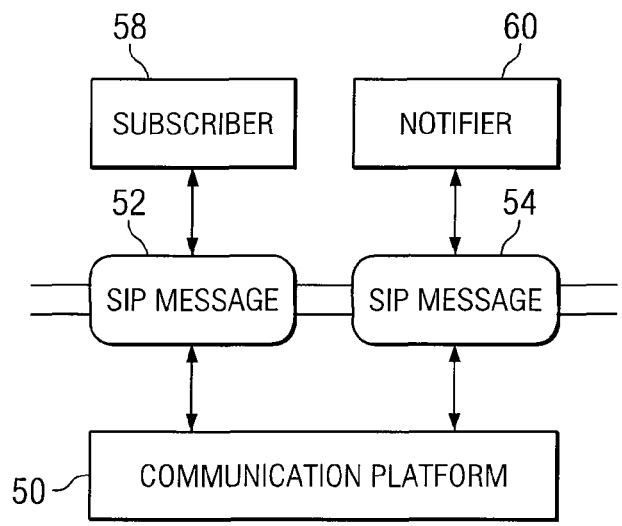
FIG. 2 is a simplified component diagram that illustrates an open system interface between endpoints in a certain embodiment of the present invention.

FIG. 2 is a simplified component diagram that illustrates an open system interface between endpoints in a certain embodiment of the present invention. FIG. 2 depicts an open system that has been conceptually divided into two layers. In this example, the open system interface is comprised of SIP messages 52-54. The endpoints include subscriber 58 and notifier 60, which may communicate with communication platform 50. Subscriber 58 and notifier 60 also may communicate with each other through communication platform 50. Here, notifier 60 also represents the subscribed resource, but notifier 60 and the subscribed resource are not necessarily coincident. Similarly, subscriber 58 in this example also represents the subscribing resource (i.e. the endpoint from which the SUBSCRIBE request originated), but subscriber 60 (i.e. the endpoint to which NOTIFY messages are sent) is not necessarily coincident with such a subscribing resource. Moreover, communication platform 50 also may be a subscriber itself. Each endpoint in FIG. 2 includes an open system component operable to exchange messages through the open system interface, but may further include a proprietary component operable to process the information included in the messages.

Figure 3:
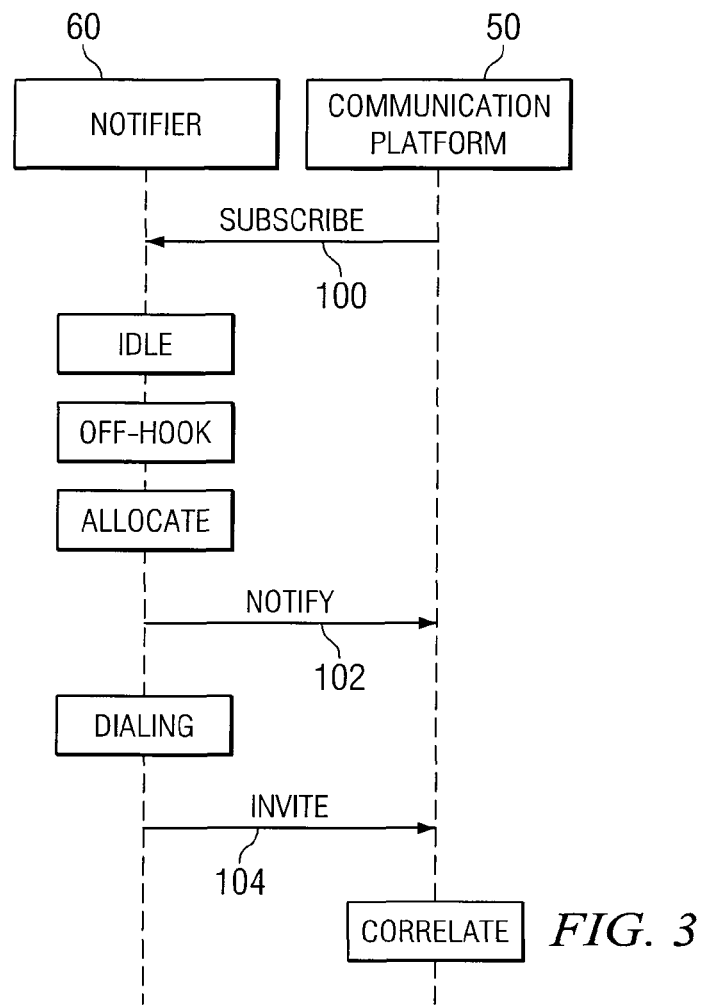
FIG. 3 is a sequence diagram that illustrates an example operation of one embodiment of the present invention.

FIG. 3 is a sequence diagram that illustrates an example operation of one embodiment of the present invention. In this exemplary operation, communication platform 50 subscribes to hook state transitions on notifier 60. Thus, the operation begins when communication platform 50 sends SUBSCRIBE request 100 to notifier 60. In this example operation, the SUBSCRIBE request specifies that notifier 60 also is the subscribed resource. Subsequently, notifier 60 goes off-hook. Notifier 60 allocates a call-id and local tag and generates NOTIFY message 102. In this example, NOTIFY message 102 comprises a dialog event notification having a dialog element, as described above. Notifier 60 inserts the call-id and local-tag into the dialog element of NOTIFY message 102 and transmits the message to communication platform 50. Communication platform 50 receives NOTIFY message 102, extracts the dialog element, and stores the call-id and local tag.

Then, at some time before the hook state of notifier transitions again, notifier 60 initiates a session with another endpoint (not pictured) by sending INVITE request 104 through communication platform 50. INVITE request 104 includes the same call-id and local-tag that notifier 60 allocated and included in NOTIFY message 102. Communication platform 50 receives INVITE request 104 and correlates its call-id and local-tag with the call-id and local-tag it previously received in NOTIFY message 102.

Alternatively, the hook state of notifier 60 transitions to an on-hook state before initiating a session (e.g. a caller hangs up the phone before dialing). In such a scenario, notifier 60 may be adapted to send a second NOTIFY message to communication platform 50 indicating the on-hook state. Communication platform 50, in turn, may be adapted to remove the call-id, local-tag, and other resources allocated for correlating NOTIFY message 102 with subsequent requests.

The hook state notification and correlation features of the present invention may be applied to enable or improve the operation of many advanced calling features in a telephony environment, particularly an open system such as a SIP environment. For instance, hook state notifications can enable hook status displays associated with entries in contact lists and speed-dial lists. Combined with the correlation feature, the hook state notification also can enable or improve the operations required for digit collection, call-back, and line sharing.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

For instance, the exemplary operation described above sets forth a particular sequence of events in one embodiment of the invention, but this particular sequence is adaptable to meet varying needs. The call-id and local-tag, for example, may be pre-allocated and stored in a cache for subsequent use when notifier 60 goes off-hook, or they may be allocated dynamically as the hook state transitions. In yet another embodiment, an endpoint may be adapted to broadcast unsolicited hook state transition notification messages, rather than receiving and processing subscriptions.

What is claimed is:

1. A method for producing a hook status notification of an endpoint, the method comprising:
   detecting, by the endpoint, an off-hook state of the endpoint;
   allocating, by the endpoint, a half-dialog identification in response to detecting the off-hook state, the half-dialog identification to be associated with a dialog of the endpoint, the half-dialog identification comprising a call identification and a local tag;
   generating, by the endpoint, an off-hook notification message, the off-hook notification message comprising a session initiation protocol message; and
   associating, by the endpoint, the half-dialog identification with the off-hook notification message by embedding the half-dialog identification in a dialog information document associated with the off-hook notification message.

2. The method of claim 1, wherein the off-hook notification message is a signaling protocol message.

3. The method of claim 1, further comprising storing the half-dialog identification; receiving a second signaling protocol message initiating a dialog, the second signaling protocol message being associated with the half-dialog identification; and correlating the second signaling protocol message with the stored half-dialog identification.

4. The method of claim 1, further comprising generating a global call identifier and associating the global call identifier with the off-hook notification message.

5. The method of claim 1, further comprising generating a primary call identification and associating the primary call identification with the off-hook notification message, wherein the primary call identification identifies a primary call in a consultative call.

6. A communication system comprising:
   an endpoint, operable to:
   detect an off-hook state of the endpoint;
   allocate a half-dialog identification in response to detecting the off-hook state of the endpoint, the half-dialog identification to be associated with a dialog of the endpoint, the half-dialog identification comprising a call identification and a local
   generate an off-hook notification message, the off-hook notification message comprising a session initiation protocol message; and
   associate the half-dialog identification with the off-hook notification message by embedding the half-dialog identification in a dialog information document associated with the off-hook notification message.

7. The communication system of claim 6, wherein the off-hook notification message is a signaling protocol message.

8. The communication system of claim 6, further comprising a communication platform operable to receive and store the half-dialog identification; receive a second signaling protocol message initiating a dialog, the second signaling protocol message being associated with the half-dialog identification; and correlate the second signaling protocol message with the stored half-dialog identification.

9. A communication platform comprising a processor component operable to:
   receive an off-hook notification message comprising a half-dialog identification from an endpoint, the half-dialog identification to be associated with a dialog of the endpoint;
   store the half-dialog identification;
   receive, from the endpoint, a signaling protocol message initiating the dialog, the signaling protocol message being associated with the half-dialog identification, the off-hook notification message and the signaling protocol message comprising session initiation protocol messages; and
   correlate the signaling protocol message with the stored half-dialog identification to facilitate the dialog.

10. Software embodied in a non-transitory computer-readable medium comprising computer code such that when executed is operable to:
    detect an off-hook state of an endpoint;
    allocate, by the endpoint, a half-dialog identification in response to detecting an off-hook state of the endpoint, the half-dialog identification to be associated with a dialog of the endpoint, the half-dialog identification comprising a call identification and a local tag;
    generate, by the endpoint, an off-hook notification message, the off-hook notification message comprising a session initiation protocol message; and
    associate, by the endpoint, the half-dialog identification with the off-hook notification message by embedding the half-dialog identification in a dialog information document associated with the off-hook notification message.

11. The software of claim 10, wherein the off-hook notification message is a signaling protocol message.

12. The software of claim 10, further comprising storing the half-dialog identification; receiving a second signaling protocol message initiating a dialog, the second signaling protocol message being associated with the half-dialog identification; and correlating the second signaling protocol message with the stored half-dialog identification.

13. A communication system comprising:
    means for detecting an off-hook state of an endpoint;
    means for allocating a half-dialog identification in response to detecting the off-hook state, the half-dialog identification to be associated with a dialog of the endpoint, the half-dialog identification comprising a call identification and a local tag;
    means for generating an off-hook notification message, the off-hook notification message comprising a session initiation protocol message;
    means for associating the half-dialog identification with the off-hook notification message by embedding the half-dialog identification in a dialog information document associated with the off-hook notification message;
    means for storing the half-dialog identification;

means for receiving, from the endpoint, a signaling protocol message initiating the dialog, the signaling protocol message being associated with the half-dialog identification; and means for correlating the signaling protocol message with the stored half-dialog identification.

* * * * *